US008675670B2

(12) United States Patent
Buob et al.

(10) Patent No.: US 8,675,670 B2
(45) Date of Patent: Mar. 18, 2014

(54) DISTRIBUTION OF ROUTES IN A NETWORK OF ROUTERS

(75) Inventors: Marc-Olivier Buob, Issy les Moulineaux (FR); Bruno Decraene, Vanves (FR)

(73) Assignee: Orange, Paris (FR)

( * ) Notice: Subject to any disclaimer, the term of this patent is extended or adjusted under 35 U.S.C. 154(b) by 430 days.

(21) Appl. No.: 13/055,193

(22) PCT Filed: Jul. 3, 2009

(86) PCT No.: PCT/FR2009/051300
§ 371 (c)(1),
(2), (4) Date: Jan. 21, 2011

(87) PCT Pub. No.: WO2010/010265
PCT Pub. Date: Jan. 28, 2010

(65) Prior Publication Data
US 2011/0128888 A1    Jun. 2, 2011

(30) Foreign Application Priority Data
Jul. 23, 2008  (FR) ..................................... 08 55031

(51) Int. Cl.
*H04L 12/28* (2006.01)
(52) U.S. Cl.
USPC ........................... 370/401; 370/392; 370/254
(58) Field of Classification Search
USPC ......... 370/217, 256, 238, 228, 254, 392, 390, 370/315, 338, 401; 709/219, 223, 239
See application file for complete search history.

(56) References Cited

U.S. PATENT DOCUMENTS

| | | | |
|---|---|---|---|
| 2002/0016831 A1* | 2/2002 | Peled et al. | 709/219 |
| 2003/0126246 A1* | 7/2003 | Blouin et al. | 709/223 |
| 2003/0233474 A1* | 12/2003 | Yamamoto | 709/239 |
| 2005/0201274 A1* | 9/2005 | Guerin et al. | 370/217 |
| 2006/0153200 A1 | 7/2006 | Filsfils et al. | |
| 2006/0287948 A1* | 12/2006 | Ernst | 705/39 |
| 2007/0025277 A1* | 2/2007 | Sajassi et al. | 370/256 |
| 2008/0075008 A1* | 3/2008 | Kano | 370/238 |
| 2008/0144627 A1* | 6/2008 | Ballantyne et al. | 370/392 |
| 2008/0170550 A1* | 7/2008 | Liu et al. | 370/338 |
| 2009/0046622 A1* | 2/2009 | Hua | 370/315 |
| 2009/0252033 A1* | 10/2009 | Ramakrishnan et al. | 370/228 |

FOREIGN PATENT DOCUMENTS

EP        1 580 940 A1    9/2005

OTHER PUBLICATIONS

Bates et al., "BGP Route Reflection: An Alternative to Full Mesh Internal BGP (IBGP); RFC 4456," pp. 1-12 (Apr. 2006).

(Continued)

*Primary Examiner* — Hassan Phillips
*Assistant Examiner* — Ajay Cattungal
(74) *Attorney, Agent, or Firm* — Drinker Biddle & Reath LLP

(57) ABSTRACT

An autonomous system comprises a plurality of routers within a packet transmission network, respective links joining the routers according to a topology of routers. At the level of a first router of the autonomous system which is joined to a second router, for a route exiting the autonomous system through an exit router, a path is determined between the second router and the exit router according to performance criteria. Next, the route is announced to the second router if the first router is situated on the previously determined path.

13 Claims, 4 Drawing Sheets

(56) References Cited

OTHER PUBLICATIONS

Chen et al., "Outbound Route Filtering Capability for BGP-4, draft-ietf-idr-route-filter-16.txt," IETF Standard-Working-Draft, Internet Engineering Task Force, IETF, CH, vol. idr (16), pp. 1-11 (Sep. 1, 2006).

Jork et al., "LDP IGP Synchronization; draft-ietf-mpls-igp-sync-01.txt," pp. 1-8 (Feb. 2008).

Marques et al., "Constrained Route Distribution for Border Gateway Protocol/MultiProtocol Label Switching (BGP/MPLS) Internet Protocol (IP) Virtual Private Networks (VPNS); RFC 4684," pp. 1-14 (Nov. 2006).

Rekhter et al., "A Border Gateway Protocol 4 (BGP-4); RFC 4271," pp. 1-104 (Jan. 2006).

\* cited by examiner

DISTRIBUTION OF ROUTES IN A NETWORK OF ROUTERS

CROSS-REFERENCE TO RELATED APPLICATIONS

This application is the U.S. national phase of the International Patent Application No. PCT/FR2009/051300 filed Jul. 3, 2009, which claims the benefit of French Application No. 08 55031 filed Jul. 23, 2008, the entire content of which is incorporated herein by reference.

FIELD OF THE INVENTION

The present invention relates to the field of telecommunications, and more particularly routing protocols and network equipment running such protocols.

BACKGROUND

A conventional telecommunications network comprises network equipment, called routers, the function of which is to transmit packets. The transmission of a packet from one item of equipment to another item of equipment in the network can generally be carried out over several paths. In such a context, the routers select, according to determined criteria, the best transmission path among various possible transmission paths. A router thus selects a transmission path on the basis of information which is generally received according to a routing protocol and stored in routing tables.

A routing protocol supplies mechanisms to the routers of a network for sharing routing information between them via sessions specific to the routing protocol and, as a result, allowing routing tables that are consistent with each other to be constructed.

Several routing protocols exist.

A routing protocol called BGP (Border Gateway Protocol) ensures consistency of Internet routing. It is defined by the IETF (Internet Engineering Task Force).

An Internet network is made up of a set of autonomous networks or autonomous systems (Aas) which are interconnected. An autonomous network is a set of routers operating under a single technical administration, using an IGP (Interior Gateway Protocol) type interior routing protocol, for example IS-IS (Intermediate System to Intermediate System) or the OSPF (Open Shortest Path First) protocol, and common routing information to route the packets inside the autonomous system. Moreover, such routers use an exterior routing protocol, such as for example the BGP-4 protocol in the Internet, to route packets to other autonomous systems. Thus, two routers in the same AS can exchange routing information via sessions according to the BGP-4 protocol, in this case called iBGP, and routers of two respective different Aas can exchange routing information via sessions according to the BGP-4 protocol, in this case called eBGP.

The exchanges of information carried out via sessions according to the BGP protocol provide for obtaining, at each router of an AS, information on all the border routers, or exit routers, through which the traffic can exit the AS to a destination outside the AS. The BGP protocol then tries to associate the best exit router possible with each router of the network. However, it is to be noted that in practice, it is not always capable of knowing the best exit router.

To implement such exchanges of information according to BGP within an AS, an "iBGP full mesh" topology, as defined in RFC 4271 (RFC: Request For Comment), can be constructed in an AS. In this case, each router of the same AS establishes an iBGP session with each other router of the AS. The set of routers of the AS is therefore fully meshed by iBGP sessions. FIG. 1 illustrates such an implementation of BGP within an AS 11 in which each router x, b, c, d and e is connected with all the others via respective iBGP sessions 13, these routers x-e being furthermore connected via eBGP sessions 12 to other routers located within other ASs.

For an AS comprising a number N of routers, each router establishes (N−1) iBGP sessions and the AS comprises a total number of N*(N−1)/2 iBGP sessions. Such an implementation implies that the number of sessions increases very rapidly with the number of BGP routers present in the AS, since this number of sessions is a function of the square of the number of routers. Moreover, the configuration of a new router in the AS imposes the configuration of each of the routers of the AS, which can be complex and burdensome to administer. Furthermore, a router can establish only a limited number of BGP sessions.

According to another implementation called "iBGP route reflector", as defined in the document RFC 4456, provision is made for centralizing the iBGP distribution of routes on specific routers referred to as RRs (Route Reflectors). Here, each router of the AS establishes an iBGP session with an RR, or preferably two RRs in order to be protected from a possible failure of an RR. The RR function can also be distributed over several routers. FIG. 2 illustrates such an implementation. The AS 11 comprises the routers x, b-e. A distinction is drawn between route-reflector routers 22 and client routers 23. Sessions according to the iBGP protocol 21 are then established between each RR router and its client routers. Unlike a conventional iBGP router, an RR can rebroadcast iBGP routes. It can thus rebroadcast:

the iBGP routes that it learns through its client routers; and
the routes learnt through iBGP at its client routers.

Lastly, an RR can also be a client router of another RR and thus form a hierarchy of RRs.

But in the context of the latter implementation, the choice of specific RR routers in the AS is not easy and a poor choice can be a source of various drawbacks such as, in particular, the creation of routing loops. Furthermore, an RR selects and distributes only one route, and such a restriction can be to the detriment of BGP routing performance.

Provision can also be made for implementing in a partitioned manner, either an iBGP full mesh implementation as illustrated in FIG. 1, or a route reflector implementation as illustrated in FIG. 2. To this end, provision is made to partition the AS in question into a plurality of sub-ASs, referred to as "BGP confederations", and to set up one of the two implementations illustrated in FIGS. 1 and 2 within each sub-AS.

FIG. 3 illustrates such a setup of the iBGP full mesh implementation in a partitioning context.

The autonomous system 11 is partitioned into a first confederation 31 comprising the routers d and e, and a second confederation 32 comprising the routers x, b and c. The iBGP sessions 13 are then established in a full-mesh manner within each confederation 31 and 32.

The iBGP full mesh setup in such a partitioning context provides for limiting the rapid increase in the number of sessions as a function of the number of routers, but does not provide for solving this problem completely. Moreover, the implementation of iBGP route reflector within a sub-AS does not provide for solving the problems associated with this setup.

Furthermore, this partitioning requires determining a number of sub-Aas and defining their borders, which can prove to be complex.

SUMMARY

The present invention aims to improve the situation.

A first aspect of the invention proposes a method for broadcasting routes in an autonomous system comprising a plurality of routers within a packet transmission network; respective links connecting said routers according to a router topology; said method comprising the following steps at a first router of the autonomous system, which is connected to a second router, for a route exiting said autonomous system through an exit router:

/a/ determine a path between the second router and the exit router according to performance criteria; and /b/ announce the route to said second router if the first router is located on the path determined in step /a/.

By virtue of these arrangements, the broadcast of routes within an autonomous system, or AS, can be optimized. The distribution or broadcast of a route within an AS is here advantageously redistributed over several routers of the AS, unlike for the case, in particular, of an iBGP route reflector implementation as described previously.

Furthermore, under the conditions of one embodiment of the present invention, each route is advantageously broadcast only once, in general. This is not the case in an iBGP route reflector implementation. Indeed, in that type of implementation, the same route can be received several times by a router, generating useless messages.

Moreover, the number of sessions used for the broadcast of routing information such as the broadcast of routes in the AS, can advantageously be less than the number of sessions used for the broadcast of routes in an iBGP full mesh implementation as described previously. Indeed, it is appropriate to note here that a route is announced from a first router to a second router which are connected according to a topology established beforehand between the various routers of the AS in question. As such, a full mesh between routers in the same AS is not required. It is sufficient to make provision for establishing a session for broadcasting the routes between two routers which are already connected according to the topology in question.

The term "router topology" is understood here to mean the set of links connecting the routers in pairs, two routers connected by a link being neighboring routers.

Thus, the establishment of iBGP route broadcast sessions can advantageously be supported on the links already defined between the routers according to the router topology in question, each router being aware of its neighboring routers, i.e. the routers with which it is connected by a link of the topology.

This feature provides for solving engineering difficulties, as stated previously, which are inherent to the setup of route reflection mechanisms when RR routers are used, such as the difficulty in obtaining an efficient distribution of routing information, and the difficulty of choosing an RR which is appropriate in the router topology in question and which in particular provides for withstanding failures. It also provides for ensuring that when the network in question is a connected network, an iBGP route signaling path exists. More specifically, each router is always aware of the potential best route.

Furthermore, the problem of the rapid increase in the number of sessions with the number of BGP routers present in the AS in an iBGP full mesh topology is in this case advantageously removed.

Under these conditions, advantageously, the broadcast of iBGP routes within the network follows an optimal path between the border router announcing the route in iBGP in the AS and the router using this route, since this broadcast is based on the router topology of the network.

Provision can be made for the router topology in question in this case to come from any configuration, for example by configuring a list of links over which it is desired to activate iBGP sessions. The router topology can furthermore come from the running of a link state IGP routing protocol, i.e. one providing an automatic and dynamic discovery and broadcast of the router topology.

In the latter case, the optimal path is defined in the sense of an IGP routing protocol and is calculated by virtue of the network topology already announced by the IGP. This link state IGP is in general already used in networks to calculate paths between two routers inside the AS. In particular, it provides for effectively recalculating the routings, in the event that a topology is modified, such as the disconnection of a physical link, or if one of the routers of the AS goes down.

By being supported on such a router topology for the broadcast of iBGP routes, one can benefit from the above-mentioned advantages. Under these conditions, a change in topology such as the addition or removal of routers and/or links, or modification of metrics, is easy to manage since the route broadcast sessions are established on the basis of the router topology, which can be obtained by the use of the IGP routing protocol in question. Thus, a routing can be obtained which withstands various failures that can affect the autonomous system, and regardless of the failure scenario, a convergence to an optimal routing takes place again.

In one embodiment of the present invention, step /a/ is carried out on the basis of router topology information. Indeed, in some cases, provision can be made for the first router to have available the network topology and to use it as a basis for determining an efficient path with respect to certain performance criteria, such as for example the shortest path.

Broadcast sessions are established between the routers and step /b/ is carried out via the route broadcast session established between the first and second routers.

Thus, provision is therefore made to establish route broadcast sessions supported on links between the routers defined by the router topology, there being no restriction on the type of route broadcast session.

Each router establishes a session with its neighboring routers in the AS, i.e. with the routers to which it is connected by a link of the topology. A router does not need to be aware of the complete topology of the network in question; it only needs to know if these neighbors pass through it to reach an exit point. Thus, one can extend the field of application of the present invention to path vector IGPs, such as for example RIP.

The broadcast sessions can in particular be iBGP or MP-iBGP (Multi-Protocol interior Border Gateway Protocol) sessions. MP-iBGP corresponds to an extension of the iBGP protocol which enables autonomous systems to exchange extended information such as MPLS-VPN (Multi-Protocol Label Switching Virtual Private Network) routes, or Multicast, or even IPv6 information.

In one embodiment, provision is therefore made to establish route broadcast sessions according to another routing protocol between the routers which are connected according to the topology in question, and to carry out step /b/ via the broadcast session established between the first and second routers.

By proceeding thus, the route broadcast sessions are established according to the topology of the network in question, with the neighboring routers of each router. Thus, the route broadcast sessions are established only between two routers which are neighbors in the sense of the router topology, which can be obtained by an IGP routing protocol. Such conditions provide for both simplifying, even automating, the location of iBGP sessions while ensuring an optimal BGP routing, unlike for an iBGP RR implementation, and reducing the number of route broadcast sessions as compared with an iBGP full mesh implementation, mainly when the number of routers of the AS in question is high. Furthermore, it is to be noted that in most cases, a route is received only once, unlike in an iBGP RR implementation.

Advantageously, the steps of the method can be applied successively to each of the routers of the plurality of routers, each of these routers able to be considered at its turn as first router. The routes can then be broadcast throughout the whole AS.

Furthermore, it appears advantageous to implement steps /a/ and /b/ at the first router for all the routers which neighbor it, i.e. for the routers which are directly connected to it according to the topology in question. These steps can therefore be carried out successively for each of the second routers connected to the first router according to the topology.

In one embodiment of the present invention, the performance criteria are suitable for selecting the shortest path between the second router and the exit router. The IGP routing protocol provides for determining such shortest paths within the topology obtained for the AS.

The router topology and respective costs of the links between the routers are obtained according to the link state IGP protocol.

However, no restriction on the type of performance criteria is attached to the implementation of step /a/ of the route broadcast method.

A second aspect of the present invention proposes a router in an autonomous system suitable for implementing a route broadcast method according to the first aspect of the present invention.

A third aspect of the present invention proposes an autonomous system comprising a plurality of routers according to the second aspect of the present invention.

A fourth aspect of the present invention proposes a computer program including instructions for implementing the method according to the first aspect of the present invention when this program is executed by a processor.

Other aspects, aims and advantages of the invention will become apparent on reading the description of one of its embodiments.

BRIEF DESCRIPTION OF THE DRAWINGS

The invention will also be better understood with the aid of the drawings, in which.

DETAILED DESCRIPTION

Hereinafter, the present invention is described for the case in which the router topology used is obtained by running a link state IGP routing protocol. However, there is no restriction on the mechanism for obtaining the router topology used.

Figure 1:
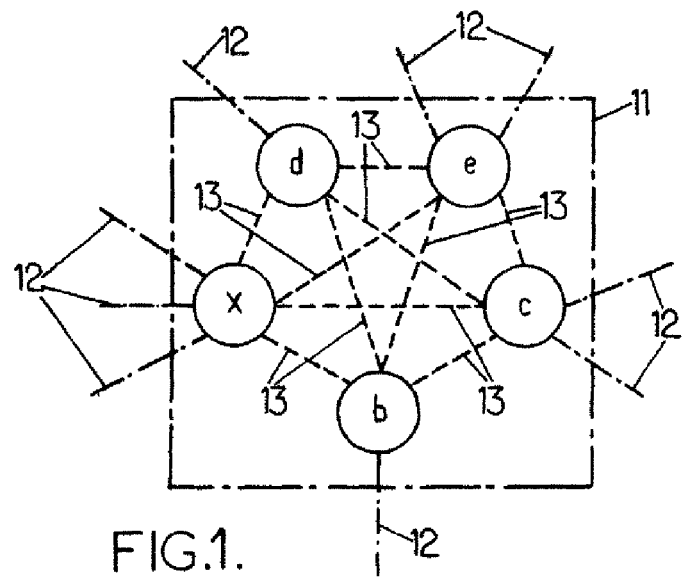
FIGS. 1, 2 and 3 illustrate three different implementations of the use of the BGP protocol in a router system according to the prior art.
Figure 2:
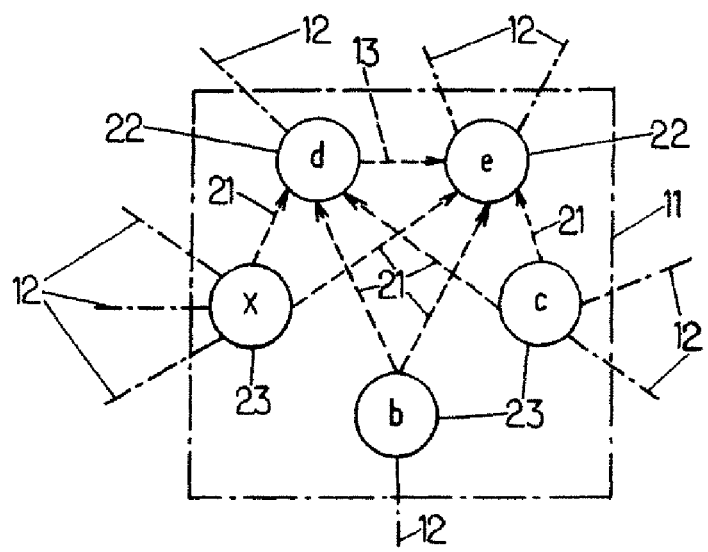
Figure 3:
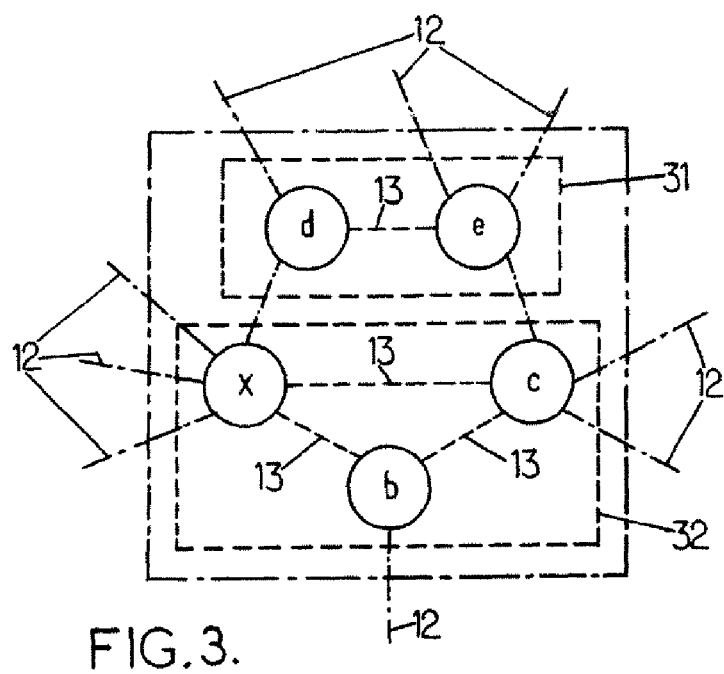
Figure 4:
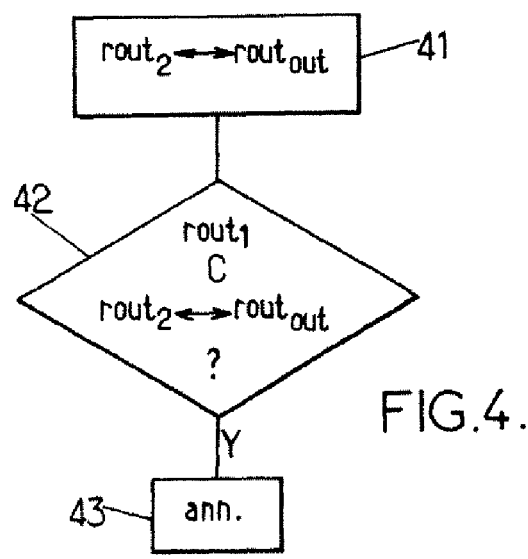
FIG. 4 illustrates the main steps of a route broadcast method according to one embodiment of the invention.

FIG. 4 illustrates the main steps of a route broadcast method according to one embodiment of the present invention, in an autonomous system comprising a plurality of routers within a packet transmission network. Provision can be made, in one embodiment, for a link state routing protocol, of the IGP type, to be run beforehand within the autonomous system in question. A topology of the autonomous system in question is hence obtained.

It is possible to not implement this step, and then provision can be made for the router topology, i.e. the set of links interconnecting the routers of the network, to be obtained by configuration.

The present invention covers all the methods for obtaining a router topology in a network.

This topology interconnects certain routers of this autonomous system and because of this provides for defining for a given router one or more neighboring routers, the neighboring routers being connected to the given router by direct links according to the topology in question.

In one embodiment of the present invention, provision is made to successively take into consideration the various routers of the autonomous system in question and to apply the following steps to them, for all the neighboring routers in the sense of the topology in question.

To apply the steps of the method according to one embodiment of the present invention, a first router $rout_1$ among the routers of the autonomous system is taken into consideration. Then, according to the topology in question, a neighboring router of this first router is determined, referred to hereinafter as second router $rout_2$. An exit route for the autonomous system, through an exit router $rout_{out}$, is also considered.

Thus, at the first router, the following steps are applied for the second router and for the route exiting the autonomous system.

First, at a step 41, an efficient path between the second router and the exit router is determined according to performance criteria.

It is appropriate to note that such performance criteria can correspond to a determination of the shortest path in the IGP sense between the second router and the exit router. In that case, the first router has available information enabling it to calculate itself the shortest path between these two routers.

Then, at a step 42, the first router determines if it is itself located on this is efficient path between the second router, i.e. its neighboring router, and the exit router for the route in question.

If that is the case, at a step 43, the first router announces this exit route to its neighboring router $rout_2$. Otherwise, the first router does not announce this exit route, unlike in an implementation according to iBGP.

In one variant embodiment, the first router announces this route to its neighboring router $rout_2$ if and only if the first router is the successor of the router $rout_2$ on the efficient path from $rout_2$ to $rout_{out}$.

Advantageously, provision is made to carry out steps 41 to 43 at this first router for all the routers which are its neighbors in the sense of the topology in question, and for all exit routes of the autonomous system in question. Then, advantageously, this method can be applied to all the routers of the autonomous system so as to efficiently broadcast the routes throughout the whole autonomous system.

It is therefore appropriate to note that a route broadcast session according to one embodiment of the present invention is advantageously established between all the neighboring routers in the sense of the topology in question, such as for example an IGP topology.

By using the IGP topology of the autonomous system, it is ensured that routing loops are avoided and that the state towards which the network will converge is optimal. In the event that the topology is modified, such as the disconnection of a physical link, or if one of the routers of the AS goes down, it is ensured that the new state is optimal again.

There is no restriction on the type of routing protocol for supplying a topology of an autonomous system with regard to the present invention.

Provision can for example be made to use a link state IGP protocol. In this case, each router announces to the other routers of the AS a part of the topology of the AS of which the router was directly aware, i.e. its own prefixes, the list of its neighbors and cost values respectively associated with the neighbors. Based on these IGP path announcements within the AS, each router can deduce an IGP topology of this AS, and calculate the shortest paths from any router of the AS to all the routers of the AS, in particular by implementing a Dijkstra algorithm.

In one embodiment of the present invention, each router establishes an iBGP session with each of the other neighboring routers in the same AS, i.e. with which it is directly connected by an IGP link.

Provision can be made for the way in which a route is announced by a router, according to one embodiment of the present invention, to a neighboring router to be indifferent to the way in which it has itself learnt these routes. Thus, for example, if this first router x has learnt a route via an eBGP session, it can announce it at a step 43 according to the route broadcast method as described in the BGP standard, and more specifically RFC 4271 (RFC: Request For Comment).

If the route is announced for the first time according to the iBGP protocol, the first router can announce it at a step 43 as described in the BGP route reflector standard, and more specifically RFC 4456.

Figure 5:
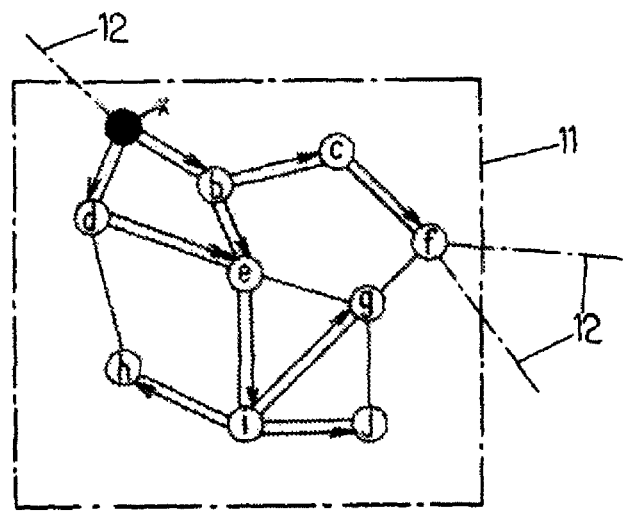
FIGS. 5, 6 and 7 illustrate the implementation of a route broadcast method in a network according to one embodiment of the present invention for various routes.

FIG. 5 illustrates such an implementation in a network according to one embodiment of the present invention. Such a network illustrated in FIG. 5 comprises an AS 11 which includes routers x, b-j. The links which are illustrated in non-arrowed solid line correspond to IGP links which interconnect the routers of this AS, according to the topology in question. These solid lines also correspond to the route broadcast sessions according to one embodiment of the present invention. The arrowed lines represent the actual broadcast in the direction of the arrow, at step 43, of a route from a router to a neighboring router according to the route broadcast method of one embodiment.

In the topology in question, the IGP links between two routers are weighted so as to enable a shortest path calculation:
  the links x-b, x-d, d-e, b-e, b-c, e-i, i-h, i-j, i-g and g-f are assigned the weight 1;
  the link c-f is assigned the weight 2;
  the link d-h is assigned the weight 4; and
  the links e-g and g-j are assigned the weight 9.

It is appropriate to note here that the metrics associated with the links can be asymmetric according to the direction of the link. For example, the metric associated with the link |x,b| can differ from the metric associated with the link |b,x|.

The broadcast of routes, as illustrated in FIG. 5, is related to the route(s) exiting the AS 11 through the exit router $rout_{out}$ x, or "next hop BGP" x.

In one embodiment of the present invention, the BGP routes for which the router x is the exit router are broadcast as follows.

Each router of this AS calculates for all its neighboring routers the shortest path to reach the router x as next hop of the BGP route, or as exit router of the route in question.

Thus, for example, the router x determines the shortest path to reach it as exit router, from the router b and from the router d.

From the router b, the next router to reach the router x is the router x itself. Consequently, the router x announces to the router b the BGP routes having x as exit router.

The same applies for the router d. Specifically, from the router d, the next router to reach the router x is the router x itself. Consequently, the router x announces to the router d the BGP routes having x as next hop or exit router.

Once the route broadcast method has been applied to the router x for all its neighboring routers, one can move to the router b.

Thus, in the same way, the router b calculates for each of its neighbors, i.e. in this case the routers e, c and x, their shortest path to reach the exit router x for the BGP routes.

From the router c, the next neighboring router used to reach the exit route x is b, therefore the router b announces to the router c the BGP routes having as next hop the router x.

The same principle is applied easily to the neighboring router e.

On the other hand, the router x as neighbor to the router b does not respond to the same criteria since the shortest path between the router x as neighbor to the router b and the exit router x, in the sense of the topology presented, does not pass through the router b. Consequently, b does not announce, or does not broadcast, the BGP routes to the neighboring router x.

Likewise, the router e calculates for each of its neighbors b, d, g and i the shortest respective paths to reach the next hop x for the BGP routes.

From the neighboring router b, the shortest path to reach the next hop x passes through x as next hop, without passing through e, and therefore the BGP routes having as next hop x are not announced to the router b.

From the neighboring router d, the shortest path to reach the next hop x passes through x as next hop, without passing through the router e, and therefore the BGP routes are not announced to the router d.

From the neighboring router g, the next router on the shortest path to reach the next hop x is the router i and therefore it is not the router e. Consequently, the router e does not announce the BGP routes to the router g.

From the router i, the next router to reach the next hop x is the router e. The router e therefore announces the BGP routes having as exit router the router x, to the router i.

Thus, gradually, the BGP routes having as next hop x are broadcast within the AS according to the graph illustrated by the arrowed solid lines in FIG. 5.

Figure 6:
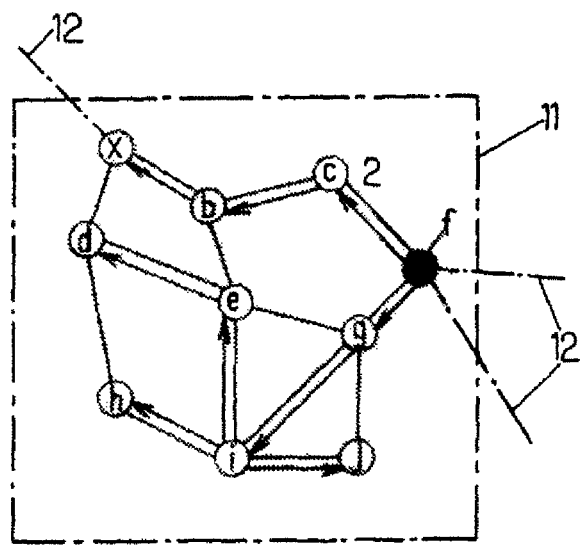

FIG. 6 illustrates a BGP route broadcast graph having as exit router the router f in the same AS 11 as that illustrated in FIG. 5.

Under these conditions, the BGP route having as exit router the router f are broadcast:
  by the router f to the routers c and g;
  by the router c to the router b;
  by the router b to the router x;
  by the router g to the router i;
  by the router i to the routers h and e; and
  by the router e to the router d.

Figure 7:
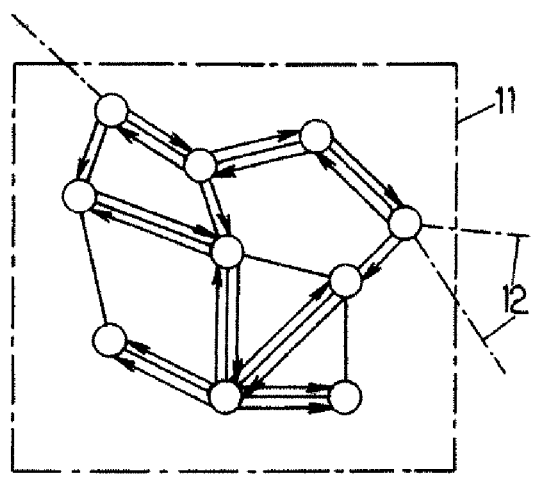

FIG. 7 illustrates the graphs for the simultaneous broadcast of BGP routes having as next hop the router x and the router f respectively, according to one embodiment of the present invention.

By virtue of the provisions of the present invention, in the above context, the broadcast of a route is carried out in such a way that each router uses the nearest exit router. Thus, a route broadcast is obtained that is efficient and carried out according to the shortest path for each router of the AS.

In one embodiment of the present invention, when an IGP link between two routers drops, provision is made for the corresponding route broadcast session not to drop immediately after the drop of the IGP link.

By maintaining the route broadcast session for a few moments, then even though the corresponding IGP link has disappeared, it is possible to wait for a convergence of the route broadcast, according to one embodiment of the present invention, according to a new path. This new path comes from the convergence of the routing protocol, such as the IGP protocol, which provides for obtaining the topology on the basis of which the route broadcast is carried out.

It can also be advantageous to specify in a BGP message, and more specifically, for example, via an error code, that the drop of this route broadcast session is deliberate, and as such "normal", in the sense that it is not due to a BGP issue.

Figure 8:
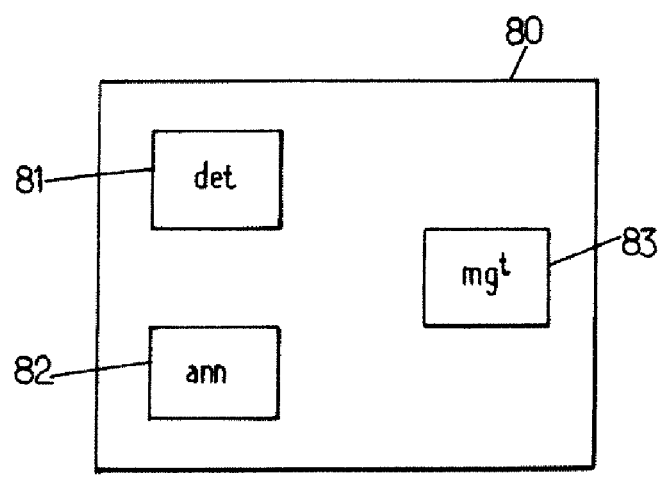
FIG. 8 illustrates a router according to one embodiment of the present invention.

FIG. 8 illustrates a router according to one embodiment of the present invention.

A router 80 is connected by a link, according to the router topology in question, to another router.

This router 80 comprises:
- a determination unit 81 suitable for determining, for an exit router, whether the router belongs to a path between this other router and the exit router, said path corresponding to performance criteria; and
- a broadcast unit 82 "ann" (for "announcement") suitable for announcing the route to said other router if the router is located on the path determined by the determination unit.

It can furthermore comprise a route broadcast session management unit 83 "mgt" (for "management") suitable for establishing route broadcast sessions according to another routing protocol with the routers which are connected to it according to the topology.

The session management unit 83 can also be suitable for managing the route broadcast sessions following modifications to the router topology.

In the event of a simple failure, it is possible that a positive deflection appears during the convergence of route broadcast sessions according to one embodiment of the present invention, but no routing loop appears.

The consequences of a router failing are similar to those of a drop of an IGP link and are described previously.

In one embodiment of the present invention, a change in the IGP topology of the autonomous system involves a corresponding arrangement at route broadcast session level.

Hereinafter, such an arrangement is described upon the appearance of a new IGP link between two routers x and b in the IGP topology used for the implementation of the present invention. A new IGP link preferably leads to the establishment of a new route broadcast session, then a new shortest path calculation for the neighbors and the making, or not, of a decision for the broadcast of routes, according to the method described here.

It is appropriate to take into account the time to establish this new route broadcast session before proceeding with the route announcements related to step 43 of this route broadcast method. To this end, provision can be made for the former neighboring routers of the router x to wait for the expiry of a timer before carrying out a shortest path calculation for their respective neighboring routers according to one embodiment of the present invention.

In general, following a change in IGP topology, there is no urgency to suppress route broadcast sessions that have become obsolete.

It is possible that, with respect to a given IGP topology, a new router appears, or reappears following a failure. In that case, like the current state of the art, it is advantageous to broadcast the BGP routes rapidly to this new router. To this end, this new router implements the steps of the route broadcast method according to one embodiment of the present invention. The routers already present in the topology in question can advantageously establish a route broadcast session with this new router, if the latter is their neighboring router in the sense of the IGP topology.

A further advantage of this invention is that, if the iBGP session is not yet established, since iBGP sessions follow the same topology as IGP sessions, in one embodiment, provision can be made to announce in the IGP protocol context the topology of the route broadcast sessions in order to be able to detect a difference in topology between the route broadcast sessions and the IGP links. For example, this IGP protocol context can be announced in the same way as an LDP (Label Distribution Protocol) protocol does so, as is described in the document draft-ietf-mpls-ldp-igp-sync-01.txt "LDP IGP Synchronization".

Advantageously, it is appropriate to note that the implementation of a route broadcast method according to one embodiment of the present invention does not require modification of BGP messages exchanged between the routers of an AS. It is simply the case that certain reactions of the existing BGP protocol are to be adapted.

Indeed, the retransmission of BGP messages relies on the BGP protocol and on the BGP RR protocol which are already supported for BGP routers.

An IGP SPF calculation is also already provided in existing routers.

Filtering of BGP routes during transmission over a BGP session is already defined in the BGP standard and reused in the BGP RT (Route Target) standard, as defined in the document RFC 4684. In this variant, the BGP routes are broadcast in accordance with the routing policies defined by the neighbors.

Here, provision can be made for a given router to calculate, in addition to the shortest path from it, the shortest paths from its neighbors. Advantage can be taken of the fact that the shortest IGP paths are calculated rapidly and that furthermore they do not delay the IGP convergence during a failure in the network since the calculations carried out at iBGP protocol level are considered to be of lower priority. Consequently, they do not delay any processing or reaction in such an AS. If for other reasons such calculations are already implemented, then no additional calculation is required.

The description has been drawn up for the particular case of a link state protocol. It is to be noted that a "distance vector" protocol can also be used, in which for each destination, the second router $rout_2$ announces to the first router $rout_1$ whether the first router is on the path of this destination. Thus, at step 41, an efficient path is determined between the second router and the exit router according to performance criteria depending on these announcements. It is emphasized here that for such a distance vector protocol, determining an efficient path entails determining an efficient next-hop router.

The invention claimed is:

1. A method for broadcasting routes in an autonomous system comprising a plurality of routers within a packet transmission network, respective links connecting said routers according to a router topology, said method comprising the following steps at a first router of the autonomous system which is connected directly by a link to a second router, for a route exiting said autonomous system through an exit router:
/a/ determining a path based on the router topology between the second router and the exit router according to performance criteria;
/b/ announcing the route to said second router if the first router is located on the path determined in step /a/; and
/c/ not announcing the route to said second router if the first router is not located on the path determined in step /a/.

2. The route broadcast method as claimed in claim 1, wherein step /a/ is carried out based on router topology information.

3. The route broadcast method as claimed in claim 1, further comprising:
establishing route broadcast sessions between the routers; and
carrying out step /b/ via the route broadcast session established between the first and second routers.

4. The route broadcast method as claimed in claim 1, wherein steps /a/ and /b/ are carried out when the router topology is modified.

5. The route broadcast method as claimed in claim 1, wherein steps /a/ and /b/ are carried out successively for each of the second routers connected to the first router according to the router topology.

6. The route broadcast method as claimed in claim 1, wherein steps /a/ and /b/ are applied successively to each of the routers of the plurality of routers, which is considered as first router.

7. The route broadcast method as claimed in claim 1, further comprising:
utilizing the performance criteria for selecting the shortest path between the second router and the exit router.

8. The route broadcast method as claimed in claim 1, further comprising:
obtaining the router topology and respective costs of the links between the routers according to the link state IGP (Interior Gateway Protocol) protocol.

9. A non-transitory computer program product comprising instructions for implementing the method as claimed in claim 1 when this program is executed by a processor.

10. A router in an autonomous system comprising a plurality of routers within a packet transmission network,
said router being connected with another router directly by a link according to a router topology;
said router comprising:
a determination unit that determines based on the router topology, for an exit router, whether said router belongs to a path between said other router and the exit router, said path corresponding to performance criteria; and
a broadcast unit that announces the route to said other router if the router is located on the path determined by the determination unit;
wherein the broadcast unit does not announce the route to said other router if the router is not located on the path determined by the determination unit.

11. The router as claimed in claim 10, additionally comprising:
a route broadcast session management unit that establishes route broadcast sessions according to a routing protocol with the routers which are connected to it according to the router topology.

12. The router as claimed in claim 11, wherein the route broadcast session management unit manages the route broadcast sessions following modifications to the router topology.

13. An autonomous system comprising a plurality of routers within a packet transmission network, said routers being routers as claimed in claim 10.

* * * * *